United States Patent
Estrada

(10) Patent No.: US 8,838,729 B2
(45) Date of Patent: Sep. 16, 2014

(54) GATHERING STATISTICS BASED ON CONTAINER EXCHANGE

(75) Inventor: Julio Estrada, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 11/771,577

(22) Filed: Jun. 29, 2007

(65) Prior Publication Data

US 2009/0006577 A1 Jan. 1, 2009

(51) Int. Cl.
*G06F 15/16* (2006.01)
*G06F 15/173* (2006.01)
*G06F 17/30* (2006.01)
*G06Q 30/00* (2012.01)

(52) U.S. Cl.
CPC ..................................... *G06Q 30/00* (2013.01)
USPC ........................... 709/217; 709/224; 707/748

(58) Field of Classification Search
USPC .......................... 709/224, 217, 219; 707/748
See application file for complete search history.

(56) References Cited

U.S. PATENT DOCUMENTS

| | | |
|---|---|---|
| 4,996,642 A | 2/1991 | Hey |
| 5,862,325 A | 1/1999 | Reed et al. |
| 5,867,799 A | 2/1999 | Lang et al. |
| 5,912,696 A | 6/1999 | Buehl |
| 5,983,214 A | 11/1999 | Lang et al. |
| 6,029,161 A | 2/2000 | Lang et al. |
| 6,055,593 A | 4/2000 | Shaberman et al. |
| 6,112,186 A | 8/2000 | Bergh et al. |
| 6,161,114 A | 12/2000 | King et al. |
| 6,249,785 B1 | 6/2001 | Paepke |
| 6,308,175 B1 | 10/2001 | Lang et al. |
| 6,311,214 B1 | 10/2001 | Rhoads |
| 6,381,579 B1 | 4/2002 | Gervais et al. |
| 6,557,042 B1 | 4/2003 | He et al. |
| 6,681,371 B1 | 1/2004 | Devanbu |
| 6,694,321 B1 | 2/2004 | Berno |
| 6,748,395 B1 | 6/2004 | Picker et al. |
| 6,775,664 B2 | 8/2004 | Lang et al. |
| 6,892,179 B1 | 5/2005 | Zacharia |
| 6,909,429 B2 | 6/2005 | Gottesman et al. |
| 6,933,433 B1 | 8/2005 | Porteus et al. |

(Continued)

FOREIGN PATENT DOCUMENTS

| | | |
|---|---|---|
| CA | 2338674 A1 | 8/2002 |
| JP | 2001067408 A | 3/2001 |

(Continued)

OTHER PUBLICATIONS

"Making the Most of Your Music Profile," http://help.yahoo.com/help/us/tutuorials/ymj2/ymj/yme_musicprofile1.html.

(Continued)

*Primary Examiner* — Viet Vu
*Assistant Examiner* — Herman Belcher
(74) *Attorney, Agent, or Firm* — Gregg Wisdom; Judy Yee; Micky Minhas

(57) ABSTRACT

A method of tracking statistics related to a container of data is disclosed. A container created by an author may be stored on a network. Other users aside from the author may be permitted to search for containers. The other users may be permitted to obtain a copy of a selected container and statistics related to a number of copies of the container obtained may be stored.

18 Claims, 8 Drawing Sheets

(56) References Cited

U.S. PATENT DOCUMENTS

| | | | |
|---|---|---|---|
| 6,976,028 | B2 | 12/2005 | Fenton et al. |
| 7,028,254 | B2 | 4/2006 | Xia et al. |
| 7,031,931 | B1 | 4/2006 | Meyers |
| 7,047,241 | B1 * | 5/2006 | Erickson ............... 1/1 |
| 7,076,494 | B1 | 7/2006 | Baer et al. |
| 7,096,234 | B2 | 8/2006 | Plastina et al. |
| 7,159,000 | B2 | 1/2007 | Plastina et al. |
| 7,165,041 | B1 * | 1/2007 | Guheen et al. ........... 705/26 |
| 7,188,193 | B1 | 3/2007 | Getsin et al. |
| 7,206,775 | B2 | 4/2007 | Kaiser et al. |
| 7,461,051 | B2 | 12/2008 | Lavine |
| 7,483,880 | B2 | 1/2009 | Rossi et al. |
| 7,590,656 | B2 | 9/2009 | Plastina et al. |
| 7,756,842 | B2 * | 7/2010 | Blumenau et al. ........ 707/694 |
| 8,091,032 | B2 | 1/2012 | Fischer |
| 8,195,676 | B2 | 6/2012 | Bond et al. |
| 2001/0047357 | A1 | 11/2001 | Vaithilingam et al. |
| 2002/0032728 | A1 | 3/2002 | Sako et al. |
| 2002/0049738 | A1 | 4/2002 | Epstein |
| 2002/0052933 | A1 | 5/2002 | Leonhard et al. |
| 2002/0055916 | A1 | 5/2002 | Jost et al. |
| 2002/0070953 | A1 * | 6/2002 | Barg et al. ............ 345/700 |
| 2002/0120609 | A1 | 8/2002 | Lang et al. |
| 2003/0105720 | A1 | 6/2003 | Ishibashi |
| 2003/0182254 | A1 | 9/2003 | Plastina et al. |
| 2003/0182255 | A1 | 9/2003 | Plastina et al. |
| 2003/0208454 | A1 | 11/2003 | Rienhoff, Jr. et al. |
| 2004/0015427 | A1 * | 1/2004 | Camelio ............ 705/35 |
| 2004/0024688 | A1 | 2/2004 | Bi et al. |
| 2004/0030795 | A1 | 2/2004 | Hesmer et al. |
| 2004/0039781 | A1 * | 2/2004 | LaVallee et al. ........ 709/205 |
| 2004/0057348 | A1 | 3/2004 | Shteyn et al. |
| 2004/0243299 | A1 | 12/2004 | Scaer et al. |
| 2005/0022239 | A1 | 1/2005 | Meuleman |
| 2005/0251437 | A1 | 11/2005 | Meuleman |
| 2005/0289469 | A1 | 12/2005 | Chandler et al. |
| 2006/0000895 | A1 | 1/2006 | Bonalle et al. |
| 2006/0100978 | A1 | 5/2006 | Heller et al. |
| 2006/0106885 | A1 | 5/2006 | Blumenau et al. |
| 2006/0107204 | A1 | 5/2006 | Epstein |
| 2006/0129933 | A1 | 6/2006 | Land et al. |
| 2006/0143236 | A1 | 6/2006 | Wu |
| 2006/0156239 | A1 | 7/2006 | Jobs et al. |
| 2006/0200599 | A1 | 9/2006 | Manchester et al. |
| 2006/0230040 | A1 | 10/2006 | Curtis et al. |
| 2006/0230229 | A1 | 10/2006 | Getzinger |
| 2006/0242557 | A1 | 10/2006 | Nortis, III |
| 2006/0265409 | A1 | 11/2006 | Neumann et al. |
| 2006/0265421 | A1 | 11/2006 | Ranasinghe et al. |
| 2007/0022179 | A1 | 1/2007 | Kim et al. |
| 2007/0033295 | A1 | 2/2007 | Marriott |
| 2007/0060346 | A1 * | 3/2007 | Edwards ............ 463/31 |
| 2007/0061215 | A1 | 3/2007 | Waites |
| 2007/0067349 | A1 | 3/2007 | Jhaveri et al. |
| 2007/0073596 | A1 | 3/2007 | Alexander et al. |
| 2007/0074619 | A1 | 4/2007 | Vergo |
| 2007/0129817 | A1 | 6/2007 | Cadiz et al. |
| 2007/0136608 | A1 * | 6/2007 | Kirovski et al. ........ 713/193 |
| 2007/0162386 | A1 * | 7/2007 | Suzuki et al. ........... 705/39 |
| 2007/0174147 | A1 | 7/2007 | Klein, Jr. |
| 2008/0147354 | A1 | 6/2008 | Rowan et al. |
| 2008/0147420 | A1 | 6/2008 | Rowan et al. |
| 2008/0147424 | A1 | 6/2008 | Rowan et al. |
| 2008/0147773 | A1 | 6/2008 | Aaron |
| 2008/0270309 | A1 | 10/2008 | Brotman et al. |
| 2008/0295182 | A1 | 11/2008 | Ogai |
| 2009/0048860 | A1 | 2/2009 | Brotman et al. |

FOREIGN PATENT DOCUMENTS

| | | | |
|---|---|---|---|
| JP | 2001256413 | A | 9/2001 |
| JP | 2002109105 | A | 4/2002 |
| JP | 2002197011 | A | 7/2002 |
| JP | 2003015662 | A | 1/2003 |
| JP | 2003111057 | A | 4/2003 |
| JP | 2003337585 | A | 11/2003 |
| JP | 2004185788 | A | 7/2004 |
| JP | 2005242992 | | 9/2005 |
| KR | 20000053885 | A | 9/2000 |
| KR | 20010058746 | A | 7/2001 |
| KR | 20020017669 | A | 3/2002 |
| KR | 1020050027522 | A | 3/2005 |
| KR | 100724645 | B1 | 5/2007 |
| TW | 200627226 | A | 8/2006 |
| WO | 0237365 | A1 | 5/2002 |
| WO | 2004010265 | A2 | 1/2004 |
| WO | 2004042630 | A2 | 5/2004 |

OTHER PUBLICATIONS

Breen, C., "iMixing it Up," Mac Publishing LLC, 2006, http://playlistmag.com/help/2004/09/imixhowto/index.php.

"MusicMiner," http://musicminer.sourceforge.net/devel.html.

"ITunesDB," http://ipodlinux.org/ITunesDB.

Written Opinion for PCT/US2008/067812 mailed Jan. 15, 2009.

International Search Report for PCT/US2008/067812 mailed Jan. 15, 2009.

ISA Korea, International Search Report of PCT/US2008/067955, Jan. 29, 2009, WIPO, 12 pages.

ISA Korea, International Search Report of PCT/US2008/067811, Dec. 22, 2008, WIPO, 9 pages.

ISA Korea, International Search Report of PCT/US2008/067802, Oct. 30, 2008, WIPO, 10 pages.

ISA European Patent Office, Extended European Search Report of EP08771689, Jun. 10, 2010, Germany, 4 pages.

"SyncMyPortable HomePage" The Office Maven, http://web.archive.org/web/20070821170404/http:/www.syncmyportable.com/, Accessed Nov. 1, 2011.

"iTunesMyPortable Free Download—iTunesMyPortable keeps your portable audio devices synchronize," BluePrograms.com, http://itunesmyportable.the-office-maven.blueprograms.com/, Accessed Oct. 31, 2011.

"iTuneMyWalkman," Ilari Scheinin, http://ilari.scheinin.fidisk.fi/itunemywalkman/, Accessed Oct. 31, 2011.

"Microsoft Plus! Digital Media Edition Home Page," Microsoft Corporation, http://web.archive.org/web/20070219062043/http:/www.microsoft.com/windows/plus/dme/readme.asp, Accessed Nov. 1, 2011.

Dontcheva, M. et al., "Relations, Cards, and Search Templates: User-Guided Web Data Integration and Layout," Association for Computing Machinery Symposium on User Interface Software and Technology, Newport, RI., Oct. 7, 2007, 10 pages.

"European Search Report", Mailed Date: Mar. 22, 2011, Application No. EP/08780908, Filed Date: Mar. 22, 2011, pp. 5.

ISA European Patent Office, Extended European Search Report of EP08771695.7, Apr. 26, 2012, Netherlands, 7 pages.

Japanese Patent Office, Interrogatory of Japanese Patent Application No. 2010515007, Appeal No. 201224325, May 27, 2013, Japan, 7 pages.

Japanese Patent Office, Appeal Decision for Japanese Application No. 2010-515007, Nov. 21, 2013, 27 pages.

* cited by examiner

GATHERING STATISTICS BASED ON CONTAINER EXCHANGE

BACKGROUND

This Background is intended to provide the basic context of this patent application and it is not intended to describe a specific problem to be solved.

Technology has made data more transportable and able to fit on smaller devices. For example, music that previously was stored on compact discs can now be stored as an electronic file on a portable player. Many, many files may be stored on a portable device. As a result, keeping track of data has become increasingly difficult but personalization of the data is possible by creating playlists and adding art. In addition, as the data is easily transferable, there is a desire to share the data with a community. Tracking statistic on the communication of containers of data may provide valuable information to a variety of markets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of tracking statistics related to a container of data is disclosed. A container created by an author may be stored on a network. Other users aside from the author may be permitted to search for containers. The other users may be permitted to obtain a copy of a selected container and statistics related to a number of copies of the container obtained may be stored. The communication of the container from one computing device to another may be tracked either at the time of transfer or when the transferring device is in communication with a network. Statistics of the transfers of a container may be created and used by a variety of audiences.

DRAWINGS

DESCRIPTION

Figure 1:
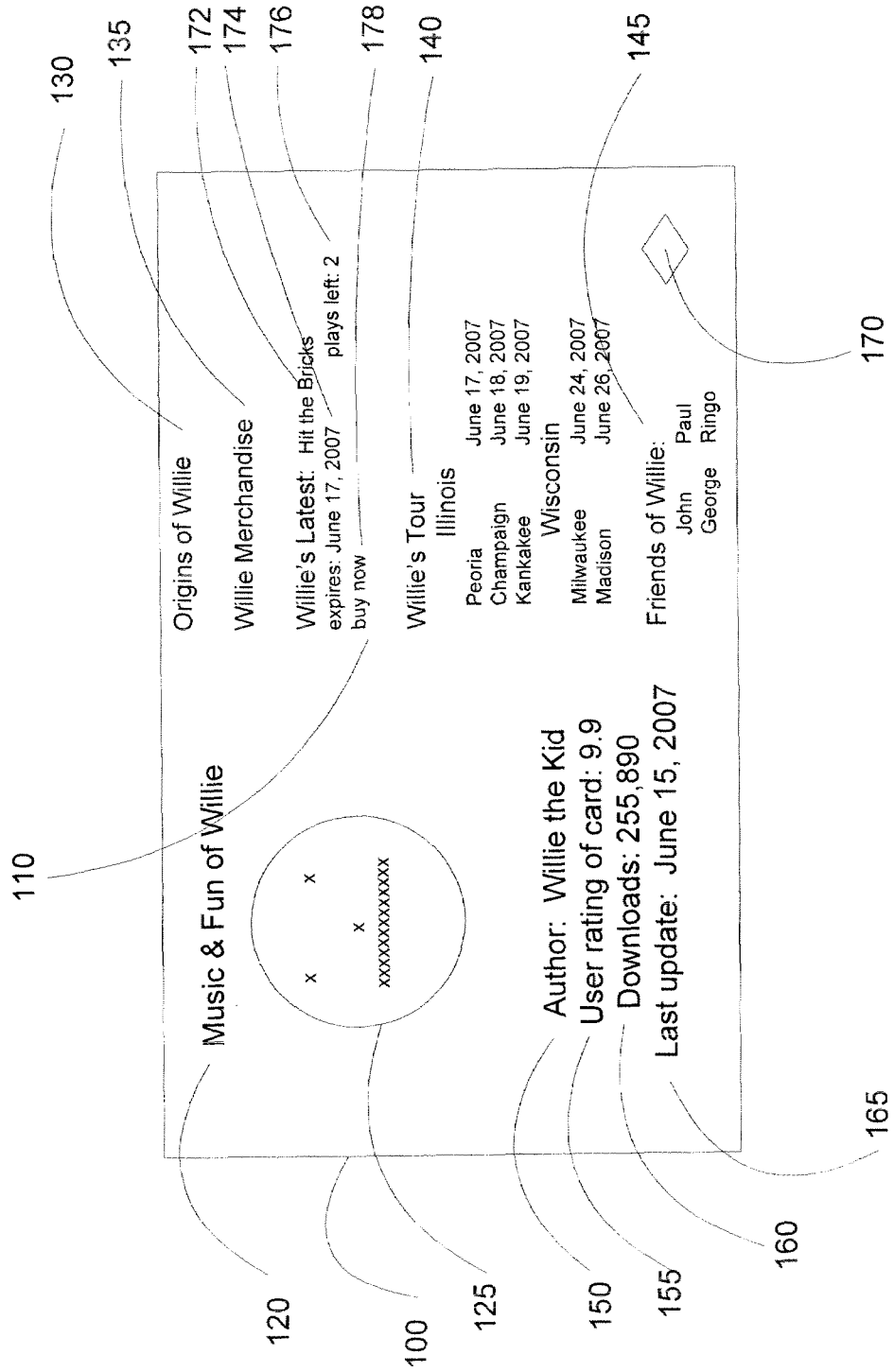
FIG. 1 is an illustration of a container.

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc., that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

The method may be stored on computer readable media. Computer readable media can be any available media that can be accessed by computer and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

A network may be used as part of the method. The computing devices may operate in a networked environment using logical connections to one or more remote computers. The remote computer may be a personal computer, a server, a router, a network PC, a peer device, a portable media player, a cell phone, or other common network node. The logical connections may include a local area network (LAN) and a wide area network (WAN) but may also include other networks. Such networking environments are commonplace in offices, enterprise-wide computer networks, intranets and the Internet. In a networked environment, program modules depicted relative to the computer, or portions thereof, may be stored in a remote memory storage device.

FIG. 1 is an illustration of a sample data container 100. The container 100 may be an electronic collection that contains a variety of data which may or may not have a common theme. In some ways, the container 100 is similar to a folder on a personal computer in that virtually any file may be place in a folder. The container 100 may take on a variety of forms such as to being displayed as a card. The variety of possible container 100 forms is limited only by the user's or designer's imagination.

The container 100 may include a variety of items 110. The items 110 may be or contain virtually any kind of media or data. Common item 110 examples include a card name 120, a symbol 125, biographical information about a band 130, merchandise available for sale related to the band 135, tour dates of a band 140, friends of the author of the container 145, the author 150, a ratings of the container 155, a number of times the container has been downloaded 160, the date of update of the information 165 in the container 100, etc.

The data in the container may be data related to advertising and the advertising may be related to the other data in the container 100. The advertising may carry referrals to other goods or services. In addition, the advertising may be coupons. In addition, the ability to access and search the container 100 may be part of subscription plan or may be a pay per download plan. Of course, other ways of helping to subsidize the container 100 are possible and are contemplated. As previously stated, the container 100 may contain virtually any data and the previous example is simply an illustration, not a limitation.

The container 100 may have some characteristics that will be further explained in this application. At a high level, the container 100 may be a container 100 in that it may include one or more components such as a bucket can hold water, soap, oil, syrup, a brush, a mop, a tennis ball, etc., either alone or in combination. The container 100 also may be heterogeneous in that it, like the bucket, may hold more than one type of component such as an executable file, a jpeg picture, an avi animation and a Microsoft Word® file. The container 100 may be transportable in that it can travel from one node to another in a wide variety of ways. Any way of communicating data may be used to transport the container 100. The container 100 may also be communicated while online or offline. For example, the container 100 may be stored on a flash memory device and the flash memory device may be in communication with several computers that are not online. The container 100 may be multi-layout capable in that it can be rendered in more than one client or offline network. For example, the container 100 may be viewed on portable media device, a computer, on a portable game, on a cell phone, etc. The container 100 may be "live" in that data in the container 100 may be updated when possible and when appropriate. The container 100 may be shareable in that the share-ability of the container 100 degrades gracefully as the licenses of the content in the container 100 expire or restrictions are triggered. The container 100 is interactive in that it can be browsed and acted upon by selecting items in the container 100. The container 100 may be playable in that items in the container 100 may be selected and played. The container 100 may be social in that it carries information about how it relates to the community in which it lives such as the number of downloads 160, etc. The container 100 may be modified by users in that the container 100 may include content generated or assembled by end users. The container 100 may have a reputation that may be determined by its community. Finally, the container 100 may be monetizable in a variety of ways.

Figure 2:
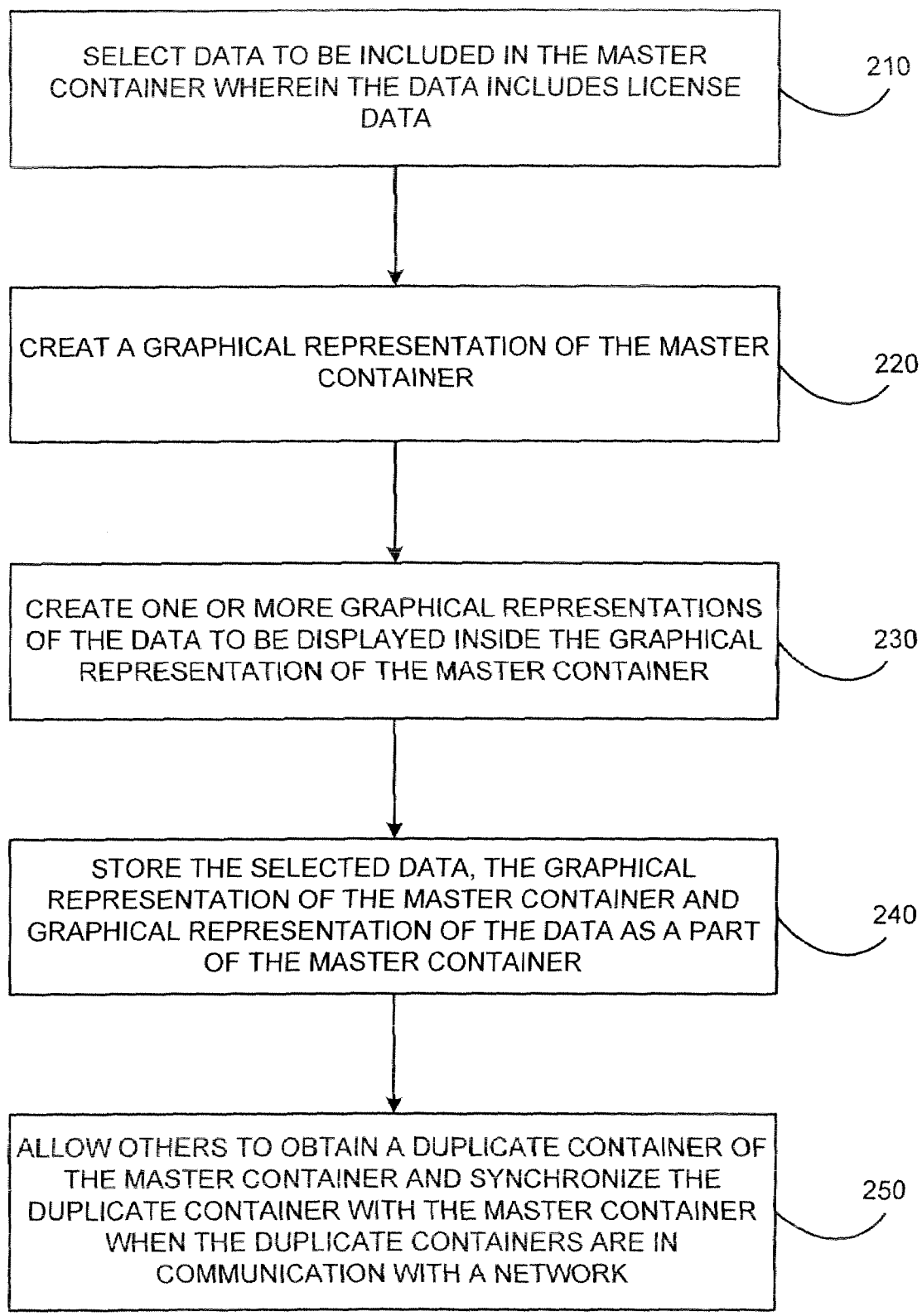
FIG. 2 is a flowchart of a method of creating a container of data.

FIG. 2 illustrates a method of creating a container 100 of data. At block 210, data may be selected to be included in the container 100. As previously stated, the data may be any data. Examples include items 110 of interest to the author of the container 100 including music, photos, tour dates, trivia, videos, lyrics, news, etc. In one embodiment, the data includes information about games or games themselves. The selection may be performed through a drag and drop operation or may be performed in virtually any other manner of adding a file to a container 100. In addition, the container 100 may include content generated or assembled by users. For example, an author could include art, animation or movies they created in the container 100. The data in the container 100 may be selectable and may execute an action related to the data selected. For example, the file may be a video file and selecting the file in the container 100 may cause the video file to be displayed. As another example, the file may be an executable file (such as a game) and selecting the file may cause the executable file to be executed (the game would begin). Of course, other actions and file types are possible and are contemplated.

The items 110 may or may not have a common theme. For example, one card may have a college theme related to a specific college. Items 110 on such a card may include the college fight song, videos of the college's band, videos of historic sporting events related to the college, maps of the campus, dates of sporting events for the college, photos of recognizable places on the college campus, games related to the college, etc. On the other hand, another example may have a theme of movies that the user finds amusing. The items 110 may be completely unrelated movies and information related to the actors, directors and producers of these unrelated movies. Of course, these are just examples, and are not meant to be limiting.

The container 100 may be created by an author 150. The author 150 may be an individual, a group of people, a computer program that selects items to be included in a container 100 or a combination thereof. The author 150 may allow others the right to view and modify the container 100. In one embodiment, others may copy some or all of the container 100 and the data therein to create their own container 100. In addition, the other users may simply modify the container 100. The author 150 may also have the right to ensure that no one else may modify the container 100 such as by "sealing" the container 100 which means changes cannot be made to the container 100 or copies of the container 100. For example, a music studio may issue a container 100 and the studio may desire that only specific music be items 110 in the container 100. In addition, there may be limited editions of the container 100. For example, a studio may only create 5,000 containers 100 to celebrate an anniversary of a popular album release.

The containers 100 also may have signatures 170 to ensure that the container 100 is authentic. The signature 170 may have a variety of forms from a unique name assigned to the container 100 by a signature authority to an encryption algorithm such as RSA that is used to verify a signature. Of course, virtually any signature would work and is contemplated.

As the data may be copyrighted data such as music, videos, e-books, etc., license information related to the media related data may also be stored in the container 100. Logically, this license information may travel with the container 100 when the container 100 is communicated from one electronic device to another. Also, the share-ability of the items in the container 100 may degrade over time as licenses expire. For example, if a song has a three day/three listen limit before it must be purchased, after the three days, the song may disappear from the container 100. In the embodiment in FIG. 1, a new song (Hit the Bricks) by Willie 172 is displayed. Below the song, the time the license to the song will expire 174 is listed as is the number of plays left 176. In addition, an option is displayed to purchase 178 the song. If the song is purchased, the license rights will change. The license data may be stored in a manner to ensure that the data is not modified without proper authority.

Referring again to FIG. 2, at block 220, a graphical representation of the master container may be created. In one embodiment, the graphical representation looks like a credit card. As previously stated, the container 100 may take on a variety of forms in addition to being displayed as a card. The variety of possible container 100 forms is limited only by the user's or designer's imagination.

At block 230, one or more graphical representations of the data to be displayed may be created inside the graphical representation of the master container 100. For example, the author may desire that the symbol 125 be displayed on the container. Other graphical representations may be added. The graphical representations may be text, numbers, drawings, picture, movies, etc. Common graphical displays may include album covers, movie promos, author information, container 100 name, etc. The graphical representation is similar to a blank canvas to an artist as virtually anything may be displayed on the graphical representation. The graphical representations are limited only by the imagination.

At block 240, the data which may represent items 110 in the master container 100 may be stored with the data being associated with the master container 100. Similar to a folder on a personal computer, the container 100 stores the data inside it and the data is reached through the container 100. The master container 100 may be stored in a variety of locations. The master container 100 may be stored on a central server that is accessible through a network such as the Internet. In addition, the master container 100 may be stored locally or may be accessed through a web site.

Figure 3:
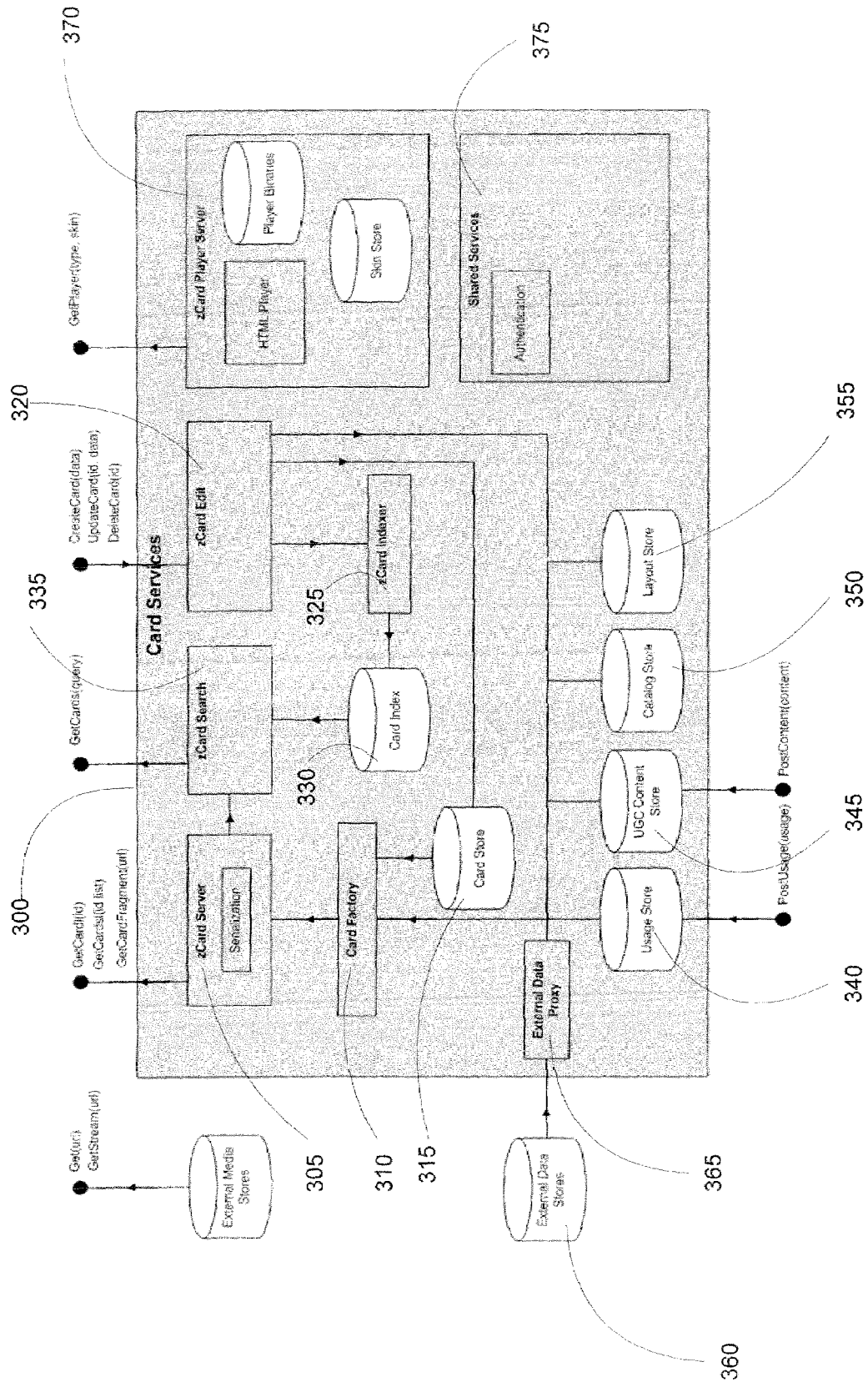
FIG. 3 is an illustration of the architecture of a network for container related activities.

FIG. 3 illustrates an embodiment where a master container 100 is stored on the network 300 and duplicate copies of the container 100 are stored locally. The network may have a container server 305 that stores containers 100 and allows searches of containers 100. Containers 100 (or cards in this example) may be created in a container factory 310. The container factory 310 may obtain data to create containers 100 from a container store 315 which may store previously created containers 100. The containers 100 in the container store 315 may be created using a container editor 320. In the editor 320, cards may be created, updated or deleted. The edited containers 100 may be added to an indexer 325 and stored in an index 330 which may be searched using a container search function 335 which may be accessible to the container server 305. In addition, the card factory 310 may draw from a usage store 340, a user generated content store 345, a catalog store 350, a layout store 355 and from external data stores 360 through a external data proxy 365. External data stores 360 may store the duplicate containers 100 of the master containers 100.

The network 300 may also contain players which may be stored in a player server. Players may include HTML players, player binaries and skin stores. Also, the network 300 may store shared services 375 such as authentication services. Authentication service 375 may be used to authenticate authors to modify sealed containers 100, for example. Another use may be where some services are provided for a fee, the users are authenticated to use the services in which they are entitled.

At block 250, others may be permitted to obtain a duplicate container of the master container. When the duplicate containers are in communication with the network 300, the duplicate container 100 may be synchronized with the master container 100. In one embodiment, changes made to the master container 100 may be communicated to the duplicate copies of the container 100 when the devices on which the duplicate copies of the container 100 are in communication with the network 300. In addition, in some embodiments, changes made to the duplicate copies of the container 100 are added to the master container 100 in a type of wiki fashion, i.e., all the changes and comments by the non-authors are added to the master container 100 for all to see.

Figure 4:
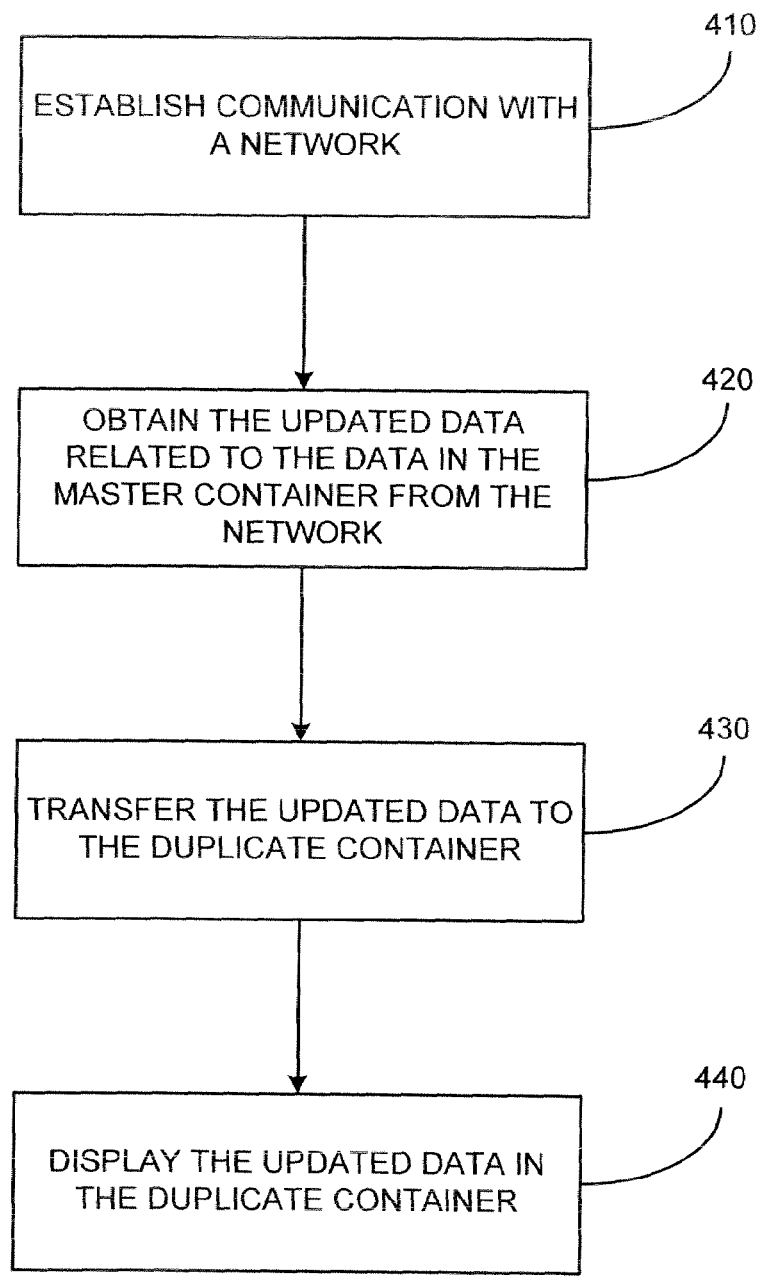
FIG. 4 is a flowchart of a method of displaying a container on a web page.

FIG. 4 may illustrate one method of distributing updated items from a master container 100 to a duplicate container 100. At block 410, communicating with a network may be established. The communication may be established in a variety of ways. In one embodiment, the communication is wireless such as communication following IEEE 802.11 guidelines. In another embodiment, the communication is wired over Ethernet. Of course, virtually any communication methodology is possible.

At block 420, updated data related to the data in the container 100 may be obtained from the network. For example, in FIG. 1, additional tour dates may be added to a music tour and tour dates that have passed may be removed from the container 100. The additional tour dates may be added to the container 100 when the container 100 is in communication with the network.

At block 430, the updated data may be transferred to the container 100. The transfer may be communicated in a variety of fashions. By way of example and not limitation, the update may be a packet of data with header information to signify that the packet contains update information. Of course, the ways and manners to transfer data are virtually limitless.

At block 440, the updated data as items in the container 100 may be displayed. In the updated tour dates example, the updated tour dates may be displayed with the other elements of the container 100.

In one embodiment, the container 100 is stored on a web site. Users may be able to review and search for containers 100 using virtually any search criterion, such as the author 150 of the container 100, the name 120 of the container 100 or a word in a song title 172. Users can access the web site through the network 300. Reviewing the container 100 on a web page may present additional options.

Figure 5:
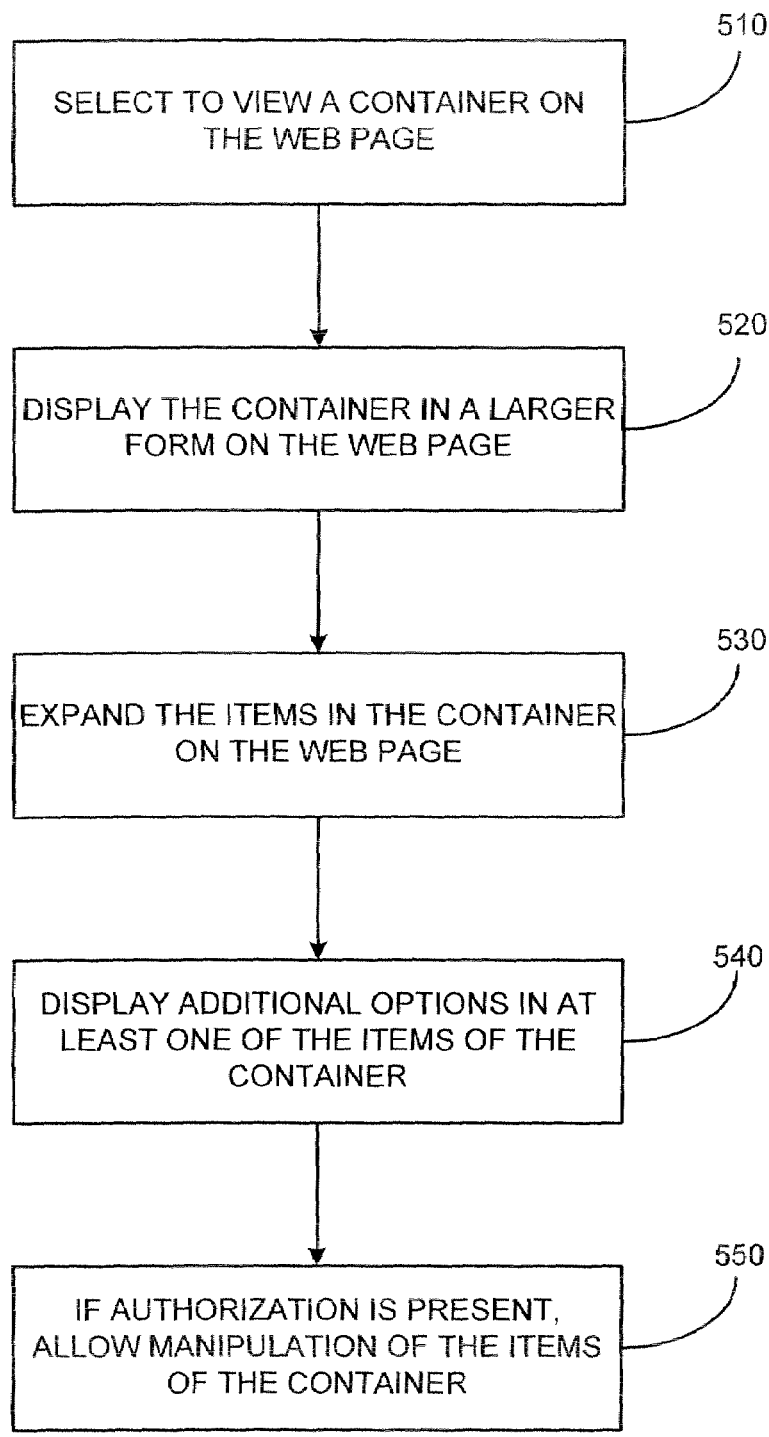
FIG. 5 is an illustration of an expanded container on a web site.

FIG. 5 illustrates a method of interaction between a web page and a media related container 100 where the media related container 100 has a plurality of items 110. At block 510, a container 100 may be selected to be viewed on the web page. The containers 100 may be reviewed, searched or recommended. In some embodiments such as in FIG. 1, the container 100 is viewed as a card and the items 110 on the card are viewed as images on the card. In one embodiment, the card appears to be of a size that would fit in a wallet. A user may design what the container 100 will look like as a card on a portable device and as a web page.

As previously mentioned, the container 100 may be stored in a variety of places and a variety of different data may be stored with the container 100. When the container 100 is stored on the network 300, a wide variety of data and options available along with the container 100. At a home page, statistics related to all users may be present.

At block 520, the container 100 may be displayed in a larger form on the web page. If the container 100 is on a portable media device, the display on the device will be relatively small. If the container 100 is viewed on a larger display such as on a personal computer viewing a web page, the container 100 may be rendered in a larger size. Ideally, images on the container 100 will have sufficient detail that when they are expanded, the images are still identifiable. In addition, some authors will create separate card images card the card itself and when the card is selected to be viewed on a web site.

At block 530, the items in the container 100 on the web page may be expanded. For example, any images on the container 100 may be expanded, lists may be more detailed, additional sections may appear and the network may even add updated or additional information.

Figure 6:
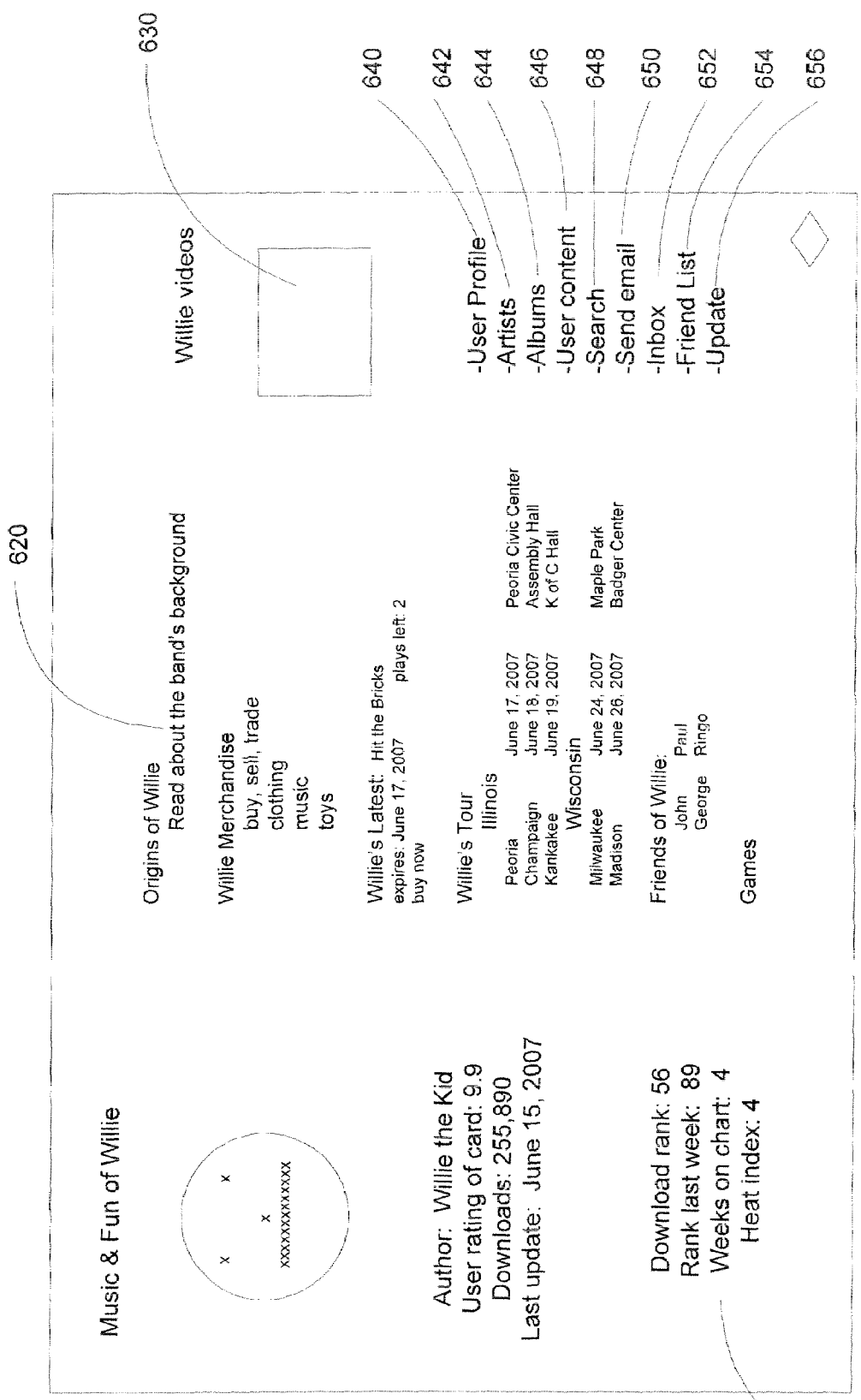
FIG. 6 is a flowchart of a method of updating container data.

FIG. 6 is an illustration of an embodiment of any expanded card 600. In this embodiment, additional statistics 610 are displayed. In addition, addition items 620 are added and expanded such as the location of the various concerts, games, etc. Videos 630 are added and additional videos may be selected by selecting the video tab. Yet additional items include user profile 640, artists 642, album 644, user content 646, search 648, send email 650, inbox 652, friend list 654 and update 656. In some embodiments, additional information is obtained by selecting one of the items. For example, by selecting user profile 640, additional information may be displayed such as friends, inbox, outbox, usage data, user generated content, etc. Selecting artists 642 or albums 644 may provide additional information such as a marketplace to buy things, editorial data such as ratings, community statistics such as the popularity, and other user generated content. This embodiment is an example and is not intended to be a limitation. Similar to the design of web pages, the variety and type of embodiments of expanded containers 600 are virtually limitless.

If the container 100 is displayed as a card, expanding the card onto a web page may entail selecting the card, displaying a larger version of the images on the card on the web page and displaying additional information related to the images.

Referring again to FIG. 5, at block 540, additional options may be displayed in at least one of the items of the container 100. In one embodiment, the additional options include allowing a user to use authoring tools to add, remove and modify items in the container 100. The modified containers 100 may be saved as new containers 100 with a new name.

At block 550, if authorization is present, manipulation of the items of the container 100 may be allowed. Authorization may be available if the author has not locked or sealed the container 100, for example. If the authorization is available, options may be displayed to add, remove or modify items on the container 100.

Figure 7:
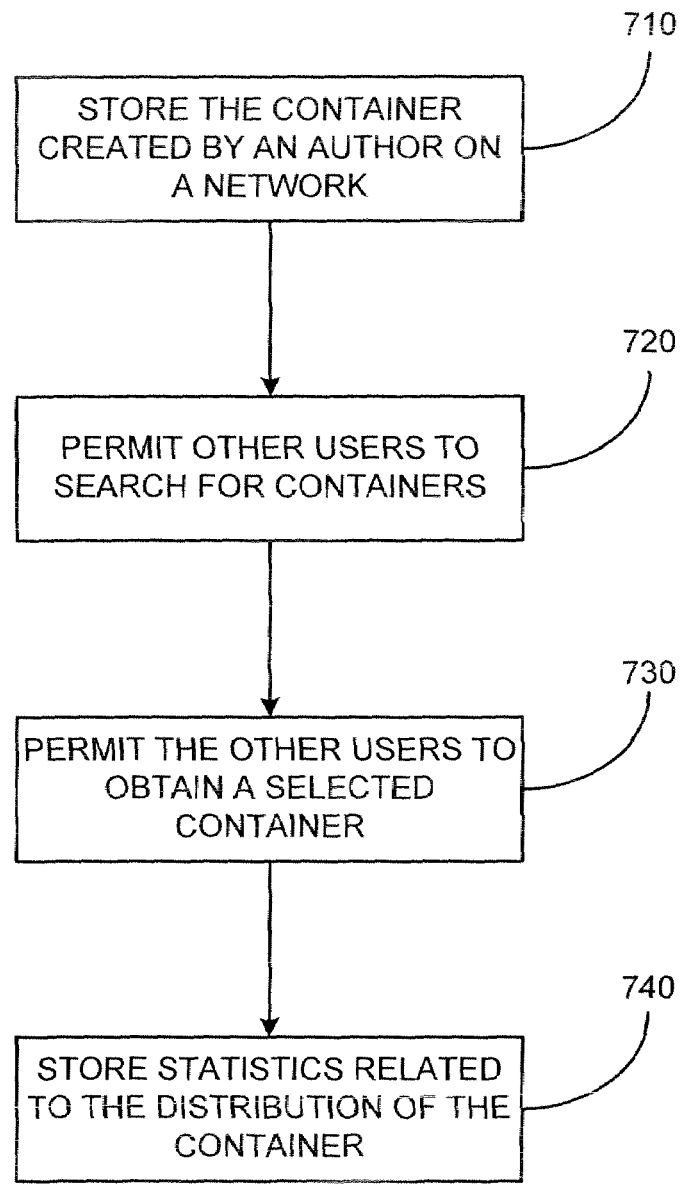
FIG. 7 is a flowchart of a method of tracking statistics related to use of containers.

Statistics may be tracked related to containers 100. FIG. 7 illustrates a method of tracking statistics related to a container 100 of media files. At block 710, the container 100 created by an author may be stored on a network. The network may be the network illustrated in FIG. 3 or any other appropriate network. At block 720, other users may be permitted to search for containers 100. The search may be executed using the search function 375 from FIG. 3 or may be executed using any appropriate search mechanism. The search may be performed from any computing device in communication with the network 300. In another embodiment, the computing device is not in communication with the network 300 but is in communication with other computing devices and the computing device may be able to search the other computing devices. In yet another embodiment, the search is of the computing device itself.

At block 730, the other users may be permitted to obtain a duplicate of a selected container 100. As previously described, the communication may occur in virtually any manner used to transfer data. As the data is transferred from the network 300, the network 300 keeps track of the number of downloads. In one embodiment, if a container 100 is sent directly from one device to another, a signal is communicated to the network 300 that such a transfer has occurred.

At block 740, statistics related to the distribution of the container 100 may be stored. As explained previously, the distribution may occur in a variety of ways from a download over the network 300 to a communication from one portable computing device to another. In the download of the network 300 example, the network 300 may easily track the number of downloads as the network is distributing the containers 100. In the example where one portable computing device communicates directly to another portable computing device, a notation may be stored on both the sending and receiving device that the transfer was made. When one of the portable computing devices is in communication with the network 300, the portable media device may communicate to the network 300 that the transfer was made and this transfer will be reflected in the statistics related to the container.

The statistics of interest may vary widely. For example, some users and advertisers may only care what women aged 19-24 like. Other relevant calculations may include how often a container 100 was downloaded, how often a container 100 was used, who used the container 100 an aggregate number of downloads, number of uses and greatest increase in the number of downloads. Other calculations may include calculating top referring web sites, most popular containers 100, number of hits to a container 100, number of container 100 views, number of unique visitors, most popular containers 100 and current visitor count. Further calculations may include where visitors entered the network 300, which paths were taken to access the network 300, where a path taken to exit the network 300, what are the most frequent referring sites, most frequent referring search engines, an the most frequently used keywords used to locate the network 300. These statistical may have many practical uses such as compensating top referring sites, determining the containers with the greatest increase in use, etc.

Yet more calculations may include an average time a user stays on the network 300, on a container 100 and a return frequency for a user to the network 300 or to a container 100. The calculation may be even more detailed such as a breakdown of physical location that accessed the network 300, a language of users that accessed the network 300, and a breakdown of the operating systems that accessed the network 300.

The statistics of a container 100 may be displayed as a graphical representation of a card and statistics related to the container 100 are displayed on the graphical representation of the card as items on the card. Additional statistics related to the card may be displayed when the card is displayed in a web browser. The statistics of the container 100 are updated when the device with the container 100 is in communication with the network.

The statistics may have a variety of uses. The statistic may be useful to advertisers that may wish to target a specific market. The statistics also may be useful by music companies or video companies to determine the current tastes related to their products. In addition, the statistics may provide a mechanism to determine whether containers are truly popular or are being affected by click fraud type abuses.

Figure 8:
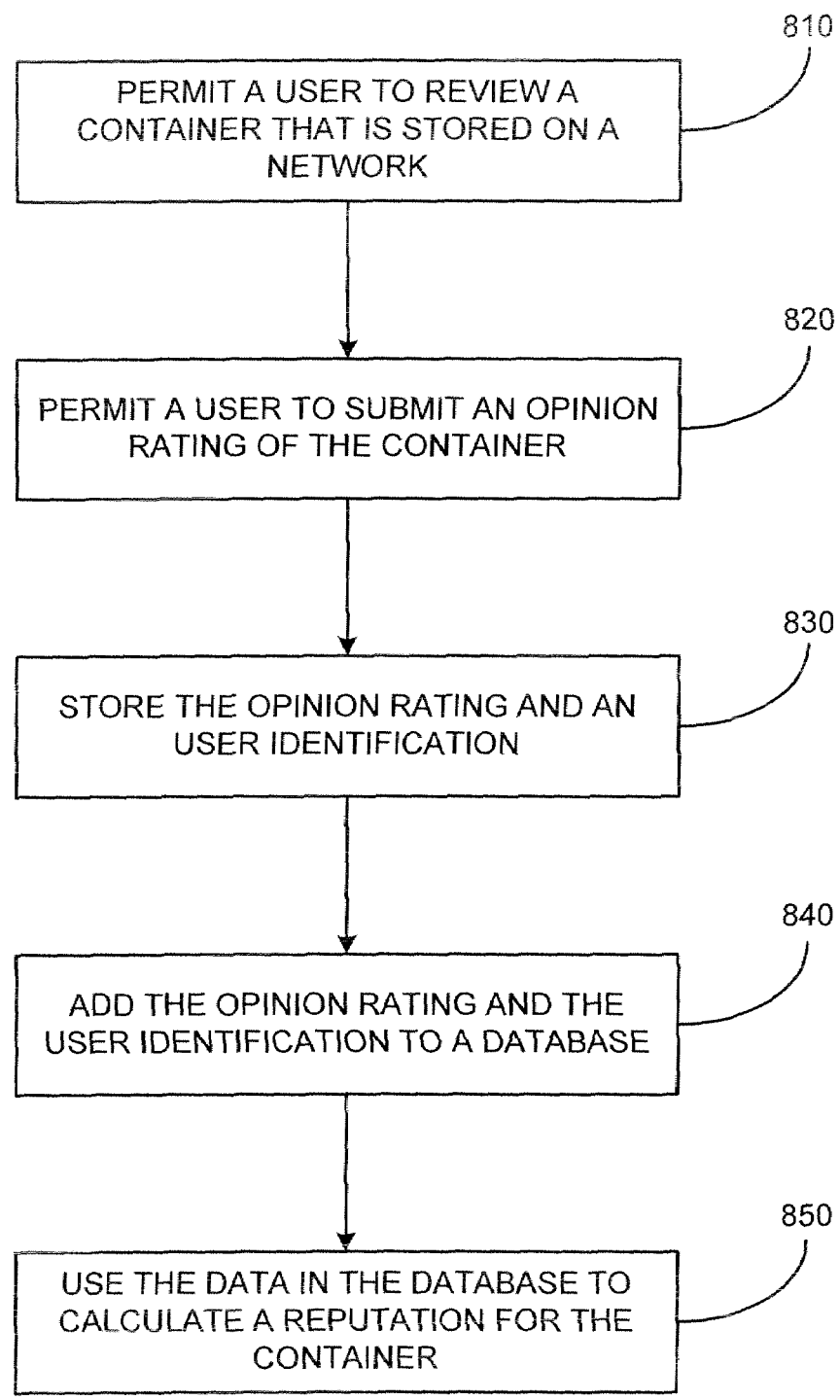
FIG. 8 is a flowchart of a method of creating a reputation for a container.

The statistics may also be used in creating reputations for containers 100. FIG. 8 illustrates a method of creating a reputation for a container 100 that contains media related data. At block 810, a user may be permitted to review a container 100 that is stored on a network. The review may be simple a review of the items in the container 100 or may be an extended review of all the items in the container 100.

At block 820, a user may be permitted to submit an opinion rating of the container 100. The opinion may be as simple as a thumbs up or a thumbs down. In another embodiment, the opinion is a number between 0 and 100. In another embodiment, the numerical rating is supplemented with further written responses.

At block 830, the opinion rating and an user identification may be stored. The user identification may be used to assess the reliability of the rating. Some users may be reflect the mainstream opinion while others may not. Further, by being able to identify the reviewer, user may be able to identify and track reviewers they like or dislike.

At block 840, the opinion rating and the user identification may be added to a database. The database may be any storage arrangement that allows searchable access to data. At block 850, the data in the database may be used to calculate a reputation for the container 100. The reputation may be calculated in a variety of ways.

In a simple case, calculating a reputation for the container 100 entails creating a weighted average of the ratings of the container 100. The weights may make the process more complicated but more meaningful. In one embodiment, increased weights are added to users that have rated previous containers 100 similar to the weighted average rating of the previous containers 100. Somewhat related, a decreased weight is assigned to users that have rated previous containers 100 dissimilarly to the weighted average rating of the previous containers 100. Another possibility is that an increase weight is added to users that have used the container 100 for a longer time than user that have used the container 100 for a shorter time. If a user has not really fully explored a container 100, then the opinion logically may have a lesser weight. Related, an increased weight may be added to users that have used the network 300 more. If a user has been a long time user, then this opinion may be more meaningful than a user just beginning to use and evaluate containers 100. In addition, an increased weight may be added to users that have used the network 300 more recently.

In another embodiment, a prediction of a users rating may be created using previous ratings of similar containers 100. The prediction of opinions may take into account a variety of factors. An increase weight may be added to users' ratings that are closer to the predicted user ratings. In this way, extreme scores may be eliminated and more useful results may be obtained.

The reputation related to the container 100 (or card) and the reputation may be displayed on the card. As expected, the displayed reputation may change as more opinions are received for a specific card and the change may be reflected on the displayed reputation on the card. The calculation of the reputation of the card may take on an almost infinite number of forms. Once the reputations of the cards has been created, groups of users may be create that appear to have common interests by selecting users that had similar opinion ratings of the same container 100 to be part of a group.

If the container 100 is stored locally, it may still be completely operational even though the device storing the container 100 is not in communication with the network. For example, if the container 100 is stored on a portable media device, all the music stored on the container 100 may be played on the portable media device even though the device is not in communication with the network.

A container 100 may be added to a device even if the device is not in communication with the network. Portable media may communicate with the device in question and containers 100 on the portable media may be added to the device. For example, the container 100 may be stored on a flash memory card and the flash memory card may be added to a portable media player. The portable media player may then access the flash memory card and the container 100 may be added to the portable media device. Similarly, a container 100 on a device may be copied to a flash memory device and the flash memory device may be moved to virtual any device that can read the flash memory device and the container 100 may then be moved to that device.

Additional data may be available when the container 100 is viewed on a personal computer. As the processing, display and memory capabilities of portable devices may be limited, not all the options related to the container 100 may be displayed on the portable device. The container 100 when viewed on a personal computer or on a web device that access a web based container 100 may display additional data and options. For example, The container 100 may be synched whenever it is in communication with an approved network source. For example, the container 100 may contain concert information for a particular music artist. This information may be updated (additional concerts added, opening acts named, etc.) when the device on which the container 100 resides is in communication with an approved network source. Approved network sources may be the Internet which may be accessed through wired or wireless methods. Of course, other networks are possible and are contemplated.

As a result of the method and apparatus described, users can create containers 100 full of data of interest to them. These containers 100 may be posted to a web site where others may share or review the containers 100. The users may then rate the container 100 or add, modify or delete items in the container 100 to create their own container. In addition, if a user appreciates a container 100, changes made to the container 100 by the author may be communicated to the duplicate container 100 whenever the device with the duplicate container 100 is in communication with the original container 100, either directly or through a network. In addition, changes made on the duplicate container 100 may be posted on the original container 100 in a wiki type style. As a result, sharing and communication is increased and it is far easier for people to keep up with other people and the changing tastes in music, fashion, movies, games, etc. The subject of the data exchanged is virtually limitless. The calculated statistics related to the transfer of the containers may be of value to advertisers, authors of containers and providers of items 110 in the containers 100.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of tracking statistics related to a container of data on a computing device, the computing device comprising a processor and a memory storing instructions for performing the method, the method comprising:
   storing the container created by an author on a network, the container including at least a media object, a container name different from a name of the media object, and an identification of the author;
   allowing other users to search for the container;
   allowing the other users to each obtain a local persistent copy of the container stored on the network;
   storing statistics related to at least a number of copies of the container obtained;
   ranking the container stored on the network based upon the stored statistics for that container relative to stored statistics for other containers stored on the network;
   allowing the author to modify the container stored on the network; and
   synchronizing each local persistent copy of the container with the container stored on the network when each local persistent copy of the container is in communication with the network, wherein synchronizing includes updating the statistics to reflect changes in the statistics from a previous communication with the network.

2. The method of claim 1, wherein the container is displayed as a graphical representation of a card and statistics related to the container are displayed on the graphical representation of the card as items on the card.

3. The method of claim 2, wherein additional statistics related to the card are displayed when the card is displayed in a web browser compared to statistics displayed when the card is displayed on a portable device.

4. The method of claim 1, wherein the statistics further comprise a determination selected from a group comprising:
   how often a container was downloaded;
   how often a container was used; and
   who used the container.

5. The method of claim 1, wherein the statistics further comprise a determination selected from a group comprising:
   top referrers, most popular pages, number of hits, number of page views, number of unique visitors, most popular pages, and current visitor count.

6. The method of claim 1, wherein the statistics further comprise determinations selected from a group comprising: where visitors entered the network, which paths were taken to access the network, and which path was taken to exit the network.

7. The method of claim 1, wherein the statistics further comprise a determination selected from a group comprising:
   most frequent referring sites, most frequent referring search engines, and most frequently used keywords used to locate the network.

8. The method of claim 1, wherein the statistics further comprise calculations selected from a group comprising: an average time a user stays on the network and a return frequency for a user.

9. The method of claim 1, wherein the statistics further comprise a determination selected from a group comprising: physical locations that accessed the network, a language of users that accessed the network, and operating systems that accessed the network.

10. The method of claim 1, wherein ranking the container stored on the network relative to other containers stored on the network is based on statistics for the container and the other containers selected from a group comprising: an aggregate number of downloads, number of uses, and greatest increase in the number of downloads.

11. A computer storage device storing computer executable instructions for tracking statistics related to a container of data, the computer executable instructions executable for:
   storing the container created by an author on a network, the container including a container name and a media file;
   allowing a user to search for the container;
   allowing the user to obtain a persistent copy of the container on a local computing device;
   allowing the user to copy the persistent copy of the container to a second local computing device while neither the local computing device nor the second local computing device are in communication with the network;
   receiving, when one or more of the local computing device and the second local computing device are in communication with the network, a signal indicating the persistent copy was copied to the second local computing device;
   tracking statistics related to distribution of the container, the statistics based on transfer of the container via the network and on the signal indicating the persistent copy was copied to the second local computing device, the statistics related to a number of copies of the container obtained and frequency of distribution of the container;
   storing the statistics; and
   ranking the container based upon the stored statistics for that container relative to stored statistics for other containers.

12. The computer storage medium of claim 11, further comprising computer executable instructions for displaying a graphical representation of a card and displaying statistics related to the container as items on the card.

13. The computer storage medium of claim 11, wherein the statistics further comprise a determination selected from a group comprising:
   how often a container was downloaded;
   how often a container was used;
   who used the container;
   who are top referrers to the container;
   how many views a container had; and
   how many visitors reviewed the container.

14. The computer storage medium of claim 11, wherein ranking the container relative to other containers is based on statistics for the container and the other containers selected from a group comprising: an aggregate number of transfers, number of uses, and greatest increase in the number of transfers.

15. A computer system comprising a processor configured to execute computer executable instructions and a memory configured to store computer executable instructions, the computer executable instructions comprising instructions for:
- storing a container created by an author on a network, the container including a rating and a number of times the container has been copied;
- allowing a user to search for the container;
- allowing the user to obtain a persistent copy of the container on a local computing device;
- allowing the user to copy the persistent copy of the container to a second local computing device while neither the local computing device nor the second local computing device are in communication with the network;
- allowing the author to modify the container; and
- synchronizing the persistent copy of the container on the local computing device when the local computing device is in communication with the network, the synchronizing including updating the number of times the container has been copied responsive to a notation stored at the local computing device indicating that a transfer was made between the local computing device and the second local computing device;
- synchronizing the persistent copy of the container on the second local computing device when the second local computing device is in communication with the network;
- tracking an amount and frequency of distributions of copies of the container;
- storing statistics related to a number of copies of the container obtained and the frequency of distributing the container; and
- ranking the container based upon the stored statistics for that container relative to stored statistics for other containers.

16. The computer system of claim 15, further comprising computer executable instructions for displaying a graphical representation of a card and displaying statistics related to the container as items on the card.

17. The computer system of claim 15, further comprising computer executable instructions for gathering statistics of distribution of the container when a computing device with the container is in communication with the network or when a computing device that distributed the container is in communication with the network.

18. The computer system of claim 15, wherein the statistics further comprise determinations selected from a group comprising:
- how often a container was downloaded;
- how often a container was used;
- who used the container;
- who are top referrers to the container;
- how many views a container had; and
- how many visitors reviewed the container.

* * * * *